United States Patent [19]
Kitayama et al.

[11] 3,793,073
[45] Feb. 19, 1974

[54] ELECTRICAL STEEL SHEETS AND STRIPS HAVING EXCELLENT PUNCHING AND WELDING CHARACTERISTICS FOR THE USE OF A LAMINATED IRON CORE

[75] Inventors: Minoru Kitayama; Montonaru Nakamura; Kiyoshi Matsui; Hiroshi Okada, all of Himeji, Japan

[73] Assignee: Nippon Steel Corporation, Tokyo, Japan

[22] Filed: Sept. 15, 1971

[21] Appl. No.: 180,653

[30] Foreign Application Priority Data
Sept. 17, 1970 Japan.............................. 45-81473
Dec. 7, 1970 Japan............................. 45-108353

[52] U.S. Cl............ 117/230, 148/31.5, 148/6.15 R, 148/6.2, 117/49
[51] Int. Cl............................ C23f 7/10, C23f 7/26

[58] Field of Search .......... 117/230; 148/6.15, 31.5; 29/472.3, 609

[56] References Cited
UNITED STATES PATENTS
| | | | |
|---|---|---|---|
| 3,632,362 | 1/1972 | Urashiyama et al........... | 117/230 X |
| 2,904,875 | 9/1959 | Trigg et al. .................... | 117/230 X |
| 3,291,636 | 12/1966 | Reighter et al................ | 117/230 X |

*Primary Examiner*—Ralph S. Kendall
*Attorney, Agent, or Firm*—Toren and McGeady

[57] ABSTRACT

Electrical steel sheets and strips having excellent punching and welding characteristics for production of a laminated iron core, which comprises an organic type coating film applied on the surface of an electrical steel sheet and strip substrate having a surface roughness larger than 20 Hr.m.s. μinch.

3 Claims, 10 Drawing Figures

SURFACE ROUGHNESS STEEL SHEET
40 Hr. m. Sμ inch
WELDING SPEED: 60 cm/min.

FIG. 4a

SMOOTH GRADE
WELDING SPEED: 40 cm/min.

FIG. 4d

SURFACE ROUGHNESS: 40 Hr.m.Sμ inch
WELDING SPEED: 80 cm/min.

FIG. 4b

SMOOTH GRADE
WELDING SPEED: 60 cm/min.

FIG. 4e

SURFACE ROUGHNESS: 40 Hr.m.Sμ inch
WELDING SPEED: 100 cm/min.

FIG. 4c

SMOOTH GRADE
WELDING SPEED: 80 cm/min.

FIG. 4f

ELECTRICAL STEEL SHEETS AND STRIPS HAVING EXCELLENT PUNCHING AND WELDING CHARACTERISTICS FOR THE USE OF A LAMINATED IRON CORE

This invention relates to electrical steel sheets and strips for production of a laminated iron core, having excellent punching characteristics for obtaining iron cores and having excellent welding characteristics for welding said punched steel sheets and strips into a laminated iron core.

To obtain an iron core for motors and transformers for use in domestic electrical instruments, electrical steel sheets and strips are punched continuously, piled and then their edges are welded.

In such a case, the polishing and changing of the punching die when the burr thereon becomes too high requires considerable time. Thus, it is required that the punching can be done as much as possible with a single polishing, namely, the punching characteristic of the steel sheet should be excellent. To obtain a laminated iron core by welding the edges of the pile of punched steel sheets and strips, it is required at the same time, in order to increase the working efficiency, that the welding can be done with as fast a speed as possible under a certain electric current and a certain screwing pressure without causing defects, such as, blowholes, at the welded part. Then, the welding characteristics should also be excellent.

While the punching characteristics depends on the quality of the electric steel sheet and strip, the insulating film applied on the surface thereof also has a remarkable influence. An inorganic coating film, for instance, of the phosphoric acid type, chromic acid type or a combination thereof has hitherto been used for such an insulating film. However, without considering the welding characteristics, only 50,000 – 150,000 punchings can be made by such treatment until the height of the burr on a steel dye reaches 50.

In order to improve the punching characteristic, an organic coating film has been utilized in recent years. The punching characteristic is improved remarkably by such a procedure. 1,000,000 – 3,000,000 punchings can be made until the height of the burr reaches 50 in punching with the a steel die, which corresponds to the punching characteristic obtained with the use of a super hard die in the case of a non-organic type film. As a result, the economical effect is remarkable, shortening both the time required for exchanging the die in the punching as well as the time for polishing the die. On the other hand, however, the organic film is decomposed by the heat of welding in the welding of the pile of punched steel sheets and strips in the subsequent stage and gives off a volatile gas. The gas permeates into the welding bead and spout out as bubbles from the bead. This forms blowholes in the welded part and causes serious problem in the welding operation.

Figure 1:
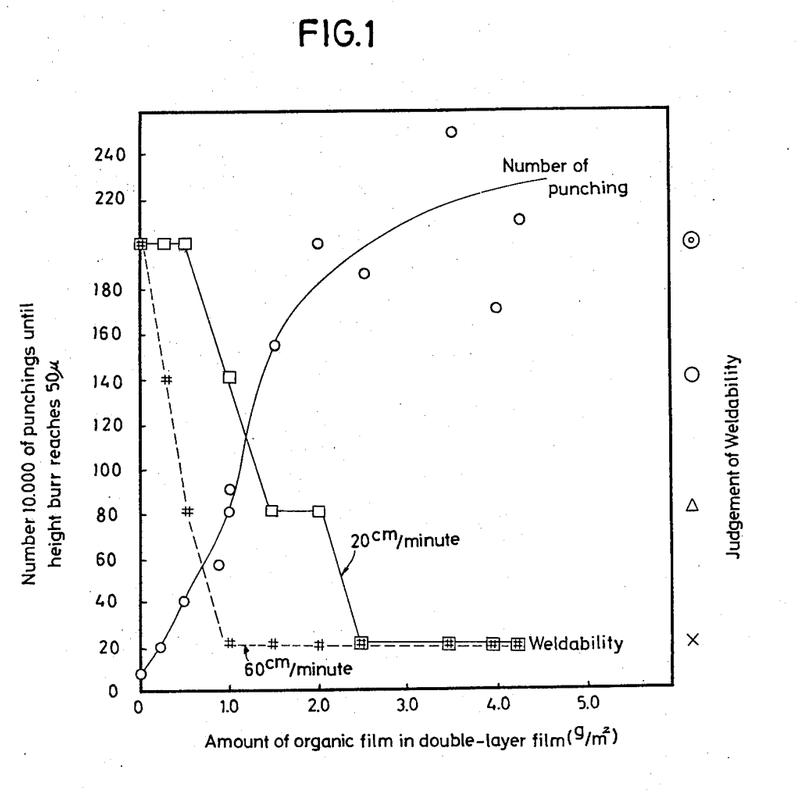

An example of the relationship between the quantity of the organic film and the punching and welding characteristics in the double layer coating treatment will be shown graphically in FIG. 1.

Coating condition
Under layer: zinc bichromate type, amount of film 1.5g/m²
Upper layer: varying amounts of the film comprising a mixture of polyvinyl formal, phenol resin and melamine resin Testing condition
Punching: steel die, clearance 5 percent, light oil as a punching oil
Welding: electric current 120 A, screwing pressure 100kg/cm², welding speed 20cm/min. and 60cm/min.

Judgement of welding characteristics
⊚: no blowhole
0: some blowholes
Δ: blowholes are formed on a half of beads
x: blowholes are formed entirely on beads As it is obvious from FIG. 1, a quite excellent punching characteristic with more than 1,500,000 punchings until the height of burr reaches 50μ can be obtained when the amount of the upper (organic) coating film is more than 1.5g/m². On the contrary, however, regarding the welding characteristic after piling the punched steel sheets and strips, in welding under the standard condition, i.e., an electric current of 120 A and the welding speed of 60cm/min., while the steel sheets and strips with an upper layer film of 0.25g/m² may be usable although the formation of some blowholes is observed, the sheet with an upper film of more than 0.25g/m² can not be used as the formation of blowholes is enormous. When the welding speed is lowered to 20cm/min., the sheet with an upper film of up to 1g/m² can be used. However, considering the safety factors, the consumer is obliged to use a welding condition with a remarkably low efficiency, such as, a welding speed of 5 – 15cm/min.

As above-mentioned, there is an incompatible relationship between the punching characteristic and the welding characteristic of the pile of punched steel sheets and strips in the case of an organic type coating film. It has been eagerly desired for a long while to obtain a laminated iron core having excellent characteristics in punching as well as in welding of the pile of punched steel sheets and strips.

Thus, the present inventors intended to offer electrical steel sheets and strips suitable for production of a laminated iron core having both of the characteristics above-mentioned, and have succeeded in developing electrical steel sheets and strips with organic coating films on their surface having both characteristics which give excellent welding results in the welding of a pile of punched steel sheets and strips.

Namely, the present invention relates to electrical steel sheets and strips having excellent punching and welding characteristics in which the surface of the steel sheets and strips is made rougher than that of common steel sheets and strips; namely the surface is made rougher than 20 Hr.m.s.μ inch, and a coating film comprising various kinds of organic material as mentioned hereinafter is applied thereon.

The present inventors have considered that the formation of blowboles in the welding of a laminated iron core is due to the phenomena that the volatile gas evolving from the organic coating film by the heat of welding permeates into the welding beads before the beads solidify, and the gas thus occluded stays therein or spouts out as bubbles. Thus, the present inventors tried to give a proper roughness to the surface of the steel sheets and strips intentionally in order to make a gap to permit the gas to pass therethrough, thus enabling easy removal of the volatile gas - evolving from the coating film - from the surroundings of the welded part when the organic coating film is decomposed in the course of the welding of the pile of punched steel sheets and strips. As a result, quite expectedly, a welded part having no blowhole is obtained successfully.

The roughness of the surface of conventional electrical steel sheets and strips with an insulating film (so-called smooth grade) has usually been 5 – 15 Hr.m.s.$\mu$ inch. The prior art gives no information on the effect of improving the welding characteristic after piling steel sheets and strips by regulation of the roughness of the surface of the steel sheets. Moreover, in applying an inorganic type insulating film, no steel sheets and strips whose surface is rougher than above-mentioned have ever been adopted because the insulating and anticorrosive characteristics are inferior.

Figure 2:
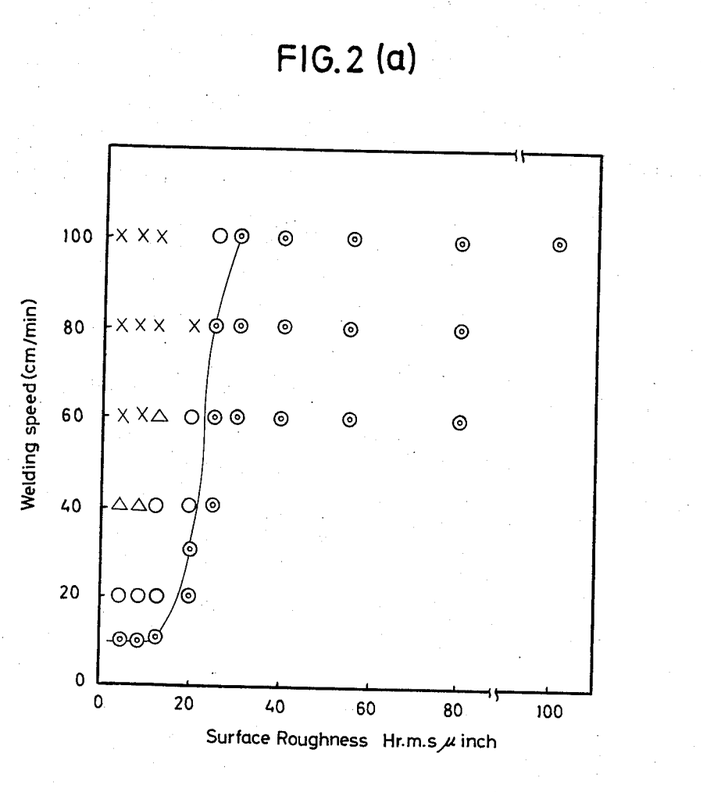

As a result of investigations on the relation between the welding characteristic and the roughness of the surface of steel sheets and strips when the pile of punched steel sheets and strips having an organic coating film is welded, the present inventors have found that, as shown in FIG. 2(a), with an identical composition of steel, coating film and coating amount, no formation of blowholes was observed. Even in a high speed welding process when the roughness of the steel surface was greater than 20 Hr.m.s.$\mu$ inch, and particularly with the use of a roughness of greater than 25 Hr.m.s.$\mu$ inch, no formation of blowholes was observed at all even when an astonishingly high welding velocity of 100cm/min. - far beyond the commonly considered standard velocity of 60cm/min. - was applied.

While there are various methods for determining the surface roughness by using an apparatus, such as, the contact needle type surface roughness measuring apparatus, the light cutting apparatus and the light interference type voidmeter, the contact needle type profilometer made of the Bendix (Type LK Tracer) was used in the present invention.

Figure 2B:
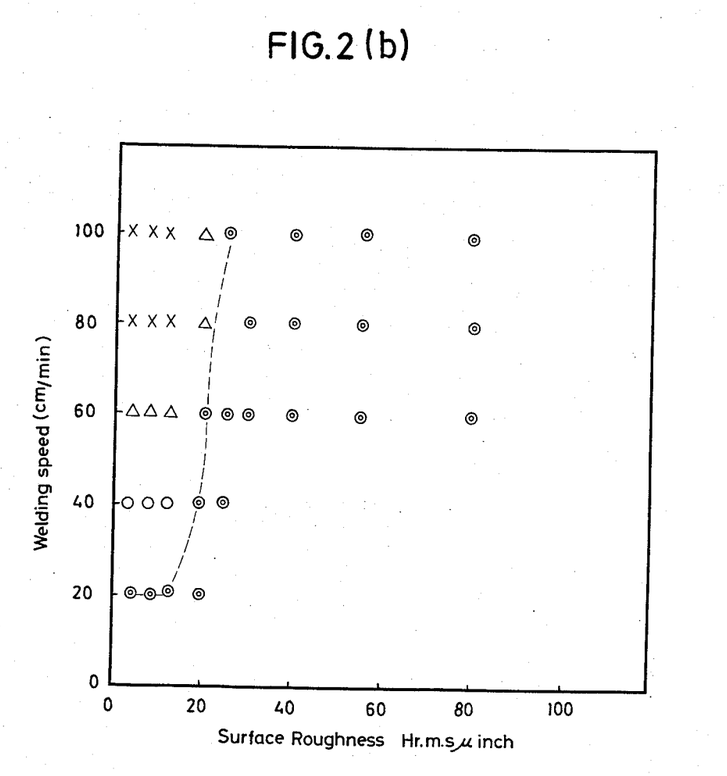

The welding characteristics of the steel sheets and strips having a double layer coating film with inorganic and organic materials is shown in FIG. 2(b). Similarly to the result in FIG. 2(a), the steel strips with the surface roughness of greater than about 20 Hr.m.s.$\mu$ inch also have an excellent welding characteristic. The same is also true for the single layer coating film comprising a mixture of inorganic and organic materials. The reason may be considered as due either to the formation of sufficient passage for the volatile gas evolved by the decomposition of the organic coating film due to the heat of welding in the neighbourhood of the welded part by making the steel surface adequately rough, or to the previous existence of sufficient pass way for the volatile gas to escape during welding due to the roughness of the surface of the organic coating film, which may be formed by the influence of the surface roughness of the steel strips.

Another feature of this invention concerns electrical steel sheets and strips having excellent punching and welding characteristics in which the surface of an organic coating film itself applied on the surface of steel sheets and strips is made rougher than in the case of common organic coating film.

As a result, a welded part having no blowholes can be obtained successfully, and the welding speed can be astonishingly increased.

Figure 3:
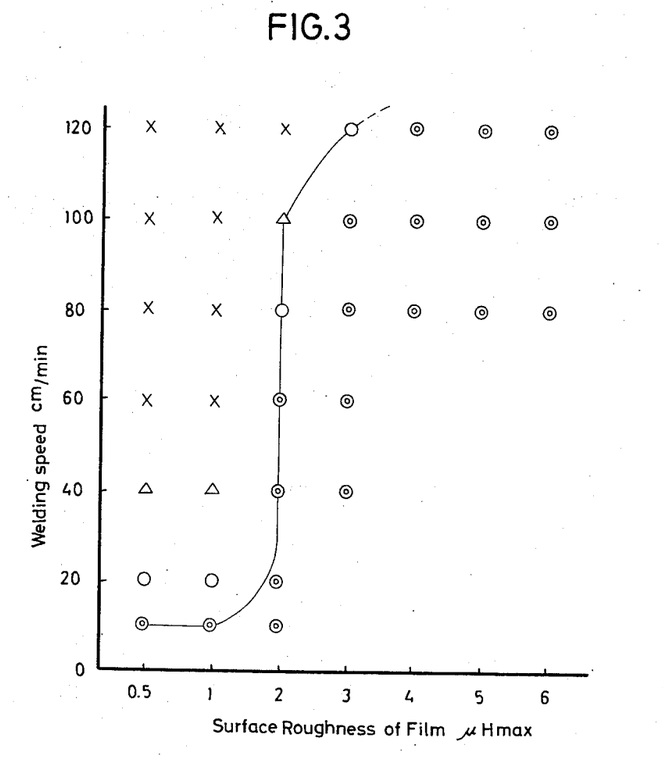
Figure 4A:
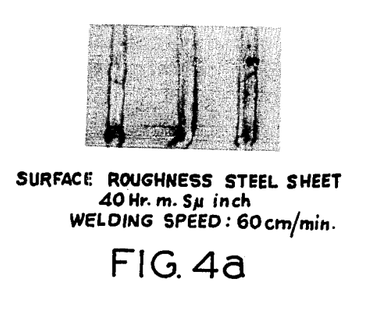
Figure 4B:
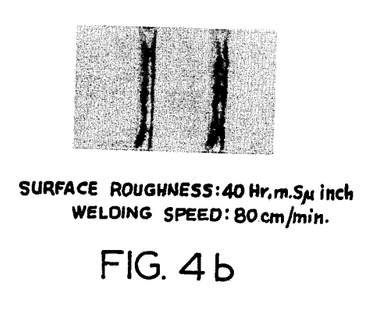
Figure 4C:
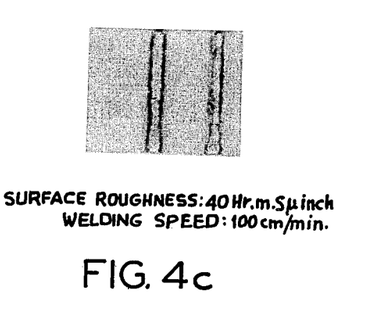
Figure 4D:
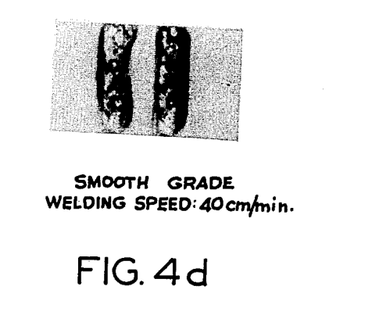
Figure 4E:
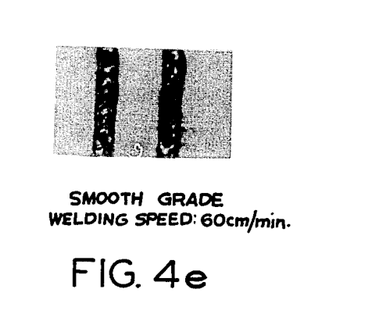
Figure 4F:
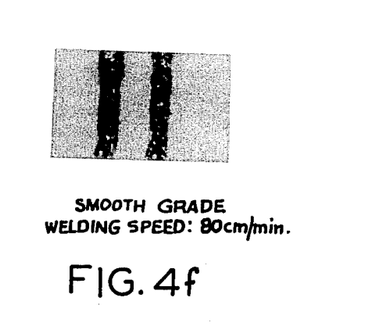

The surface of organic coating film applied on the surface of electrical steel sheet and strip has hitherto been very smooth, i.e., less than $1\mu H_{max}$ ($1\mu H_{max} \approx 10$ hR.m.s.$\mu$inch). FIG. 3 shows the relationship between the surface roughness of the organic coating film applied and the welding characteristic in a double layer coating comprising inorganic and organic coating films. As it is obvious from this example, the effect of improving the welding characteristic is obtained when the surface roughness of the organic coating film is greater than $2\mu H_{max}$. The reason may be due to the fact that the volatile gas evolved during welding is easily removed from the surroundings of the welded part. It has been proved that, in increasing the surface roughness greater than $2\mu H_{max}$, no formation of blowholes takes place at all even when an astonishingly high welding velocity of 100cm/min. - far beyond the commonly considered standard velocity of 60cm/min. - is adopted.

Similar results were also obtained in the cases of one layer organic coatings and a one layer coating with a mixture of inorganic and organic materials.

Although said surface roughness of the steel sheet and strips, 20 Hr.m.s.$\mu$inch, as well as the surface rough-ness of the coating film, $2\mu H_{max}$, deviate somewhat according to the method and condition of determination, it goes without saying that the range of such a deviation belongs naturally to the scope of this invention so long as the object of the invention is attained. While the welding characteristic improves with increasing the surface roughness of the steel sheet and strips as well as the coating film, as there is a tendency to decrease the rate of occupied area, this relation should be considered in the embodiment.

As the insulating film of this invention is of an organic type, the surface tension is small, the wetting and adhesive characteristics are excellent, and moreover, the corrosion resistance of the coating film itself is also superior. Therefore, a satisfactory result in the insulating and anticorrosive characteristics can be obtained even when the steel surface is fairly rough.

As the welding characteristic is superior in this invention, even when the amount of organic substance in the mixture of inorganic and organic materials as well as the coating amount is large, there is no need to reduce the coating amount at all to insure the welding characteristic by sacrificing the punching characteristic as in the conventional method, and the highest punching characteristics can be obtained without losing the excellent welding characteristics.

Both sides or one side of the steel surface as well as the coating film may be made rough. It suffices to make the surface somewhat rougher when one side is made rough than in the case when both sides are made rough. It is desirous to contact the rough surface with the smooth surface in piling the punched steel sheets and strips when one side is made rough.

To make the steel surface rough, such methods as to pass through a roll having a rough surface, various etching methods and a method by means of a scrubbing roller may be applicable.

As for the method of making the surface of coating film rough, for instance, the method of treating the unhardened coating film by a roller having a roughened surface during baking after an organic coating film is applied uniformly, the method of forming a coating film having striped ditches on the surface of the steel sheet and strip by using a coating roller having ditches and then cutting barred ditches on the unhardened coating film by a steel roller having ditches during baking, and the method of applying a treating solution containing organic particles with a particle size of greater than $2\mu$ may be used.

As a particle to give roughness on the surface of organic film or a film comprising inorganic and organic materials, bakelite, melamine resin and the like having a particle size greater than $2\mu$ may be used.

The form of the organic coating film in this invention is as follows.

The first form is obtained by applying an organic coating film directly on the steel sheet and strip, the second is obtained by making the coating film a double layer by applying an organic coating film on the surface of the steel sheet and strip which is coated previously with one or more of a phosphoric acid type or chromic acid type coating material, and the third is to use a mixture of one or more of a phosphoric acid type, or chromic acid type, coating material with an organic resin to obtain a coating film containing organic material.

To apply such a coating film, common methods such as the use of a roller or a spray, coating by pouring, electrolysis and electro-deposition can be adopted. The coating film is dried or baked finally by a hot blast or at 200 – 700°C.

As the welding characteristic is superior in this invention, the coating amount may be increased as compared with the amount of organic material in the conventional method. The range of the coating amount is $0.5 - 10 g/m^2$.

As an organic coating film in this invention, a substance having polar groups, such as, calcium lignin sulfonate, polyvinyl alcohol, anhydrous maleic acid resin, aminoacid resin and its denatured products, phenol resin and its denatured products, acrylic acid resin and its copolymers, vinyl acetate and its copolymers, alkyd resin, vinyl chloride and its copolymers, polyvinyl acetal, epoxy resin and its denatured products and a mixture thereof, may be used.

The coating film containing one or more of a phosphoric acid type and chromic acid type material in this invention corresponds to the conventional inorganic type coating film. As a phosphoric acid type material, for instance, phosphate of calcium, magnesium, aluminium and zinc; oxide, hydroxide and carbonate of a divalent or tervalent metal, such as, calcium, magnesium, aluminium and zinc dissolved in phosphoric acid; and a mixture thereof are included. One or more of titanium oxide, colloidal silica, colloidal alumina, boric acid and the like may be added thereto.

As a chromic acid type material, bichromate of calcium, magnesium and zinc; oxide, hydroxide and carbonate of divalent metal, such as, calcium, magnesium and zinc dissolved in an aqueous solution of anhydrous chromic acid; and a mixture thereof are included. One or more of titanium oxide, colloidal silica, colloidal alumina, boric acid and organic reducing agent may be added thereto.

As an organic resin to be mixed with the inorganic film material, water soluble-or emulsion type acrylic acid resin and its copolymers, vinyl acetate resin and its copolymers, butadiene styrene copolymer, aminoacid resin, alkyd resin, phenol resin, anhydrous maleic acid copolymer, epoxy resin and its denatured products, and a mixture thereof may be applied.

Some examples of the present invention will be set forth in the following.

Example 1

An electrical steel sheet (containing 0.7 percent of Si, 980mm width) was rolled by a rolling mill having a rough surface to obtain a steel strip of 0.5mm thickness and with a surface roughness of 35 Hr.m.s.$\mu$inch.

Said steel strip was coated with the treating solution 1 by a roller and baked at 500°C for 20 seconds. The coating amount was $6.5 g/m^2$.

Steel strips having said coating film were piled and TIG welded. Even under a high welding speed of 100cm/min. with an electric current of 120 A, fine beads were obtained without the formation of blowholes. Separately, said steel strip was punched by a steel die (with a clearance of 6 percent), and 1,750,000 punchings were possible until the height of burr reached $50\mu$.

As a comparison, a steel strip with the same quality as above and having a usual surface roughness (7 Hr.m.s.$\mu$inch) was coated with the treating solution 1 by a roller. The coating amount was $6.4 g/m^2$.

In the welding test of this steel strip under a welding speed of 20cm/min., blowholes were formed on about a half of the beads. Under a welding speed of 10cm/min., the product was useable although some formation of blowhole was observed. By using a steel die, 1,800,000 punchings were made until the height of burr reached $50\mu$.

Treating solution 1

| | |
|---|---|
| Calcium lignin sulfonate | 30kg |
| Polyvinyl alcohol | 30kg |
| Polyacrylic acid | 2kg |
| Water | 300kg |

Example 2

An electrical steel sheet (containing 0.3 percent of Si, 1000mm width) was rolled by controlling the rolling mill to obtain steel strips with varying surface roughness of 5, 7, 13, 20, 25, 30, 40, 55, 80 and 160 Hr.m.s.$\mu$inch.

Each of the strips was coated with the treating solution 2 and baked at 400°C for 60 seconds. The coating amount was, respectively, 2.5, 2.4, 2.4, 2.5, 2.5, 2.5, 2.5, 2.4, 2.6 and $2.5 g/m^2$.

These steel strips were piled, and welded under the conditions of a welding electric current of 120 A, screwing pressure of $100 kg/cm^2$ and varying welding velocity of 10 – 100cm/min. The results were as shown in FIG. 2(a). It is obvious from the results that, when the surface roughness is greater than 20 Hr.m.s.$\mu$inch, and particularly greater than 25 Hr.m.s.$\mu$inch, a quite satisfactory result can be obtained even under high welding speed.

In FIG. 4 (a), (b), (c), (d), (e) and (f), photographs of the welded part obtained with varying welding velocity for the samples having a rough surface of 40 Hr.m.s.$\mu$inch as well as a smooth surface are shown.

In the punching test for the samples with the surface roughness of 5 Hr.m.s.$\mu$inch and 40 Hr.m.s.$\mu$inch by using a steel die (clearance 7 percent), 2,500,000 punchings and 2,650,000 punchings, respectively, were possible until the height of burr reached $50\mu$. The punching characteristic was quite excellent as compared with the case of a common inorganic type insulating film.

Treating solution 2

| | |
|---|---|
| Anhydrous chromic acid | 20kg |
| Zinc oxide | 7.5kg |
| Emulsion type resin | 10kg |
| (50% solution of methyl metacrylate-ethyl metacrylate copolyer) | |
| Water | 100kg |

Example 3

An electrical steel sheet (rimmed steel, 970mm width) was rolled by a rolling mill having a rough surface to obtain steel strips of 0.5mm thickness and with varying surface roughness as in Example 2. These steel strips were coated with the treating solution 3, baked Treating solution 4

| | |
|---|---|
| 1.5% melamine resin | mixed solution |
| 1.5% alkyd resin | |

Other characteristics of the coating film in Examples 2 and 3 are shown in Table 1. It is clear from the table that the insulating and anticorrosive characteristics of the inventive coating film is similar to or somewhat superior to the inorganic type coating film for smooth surface material, and the adhesive property by fusion of the inventive coating film is superior to that of the smooth surface material.

TABLE 1.—Characteristics of the film

| | | Example 2 (film containing organic material) | | Example 3 (double layer film) | | Conventional inorganic film (chromic acid zinc oxide type) | |
|---|---|---|---|---|---|---|---|
| Hr.m.s. | | 5 (smooth) | 40 | 5 (smooth) | 40 | 5 (smooth) | 40 |
| Resistance (JIS 2nd method) | max. | 150.2 | 105.0 | 121.0 | 98.5 | 45.5 | 5.2 |
| | min. | 92.0 | 55.5 | 98.5 | 45.5 | 35.5 | 1.2 |
| | mean | 101.0 | 65.0 | 111.0 | 55.5 | 42.0 | 3.5 |
| Adhesive property | | 10 | 10 | 10 | 10 | 30 | 10 |
| Corrosion resistance | | no rust formation | spot rust formation | no rust formation | spot rust formation | spot rust formation | rust formation on total surface |
| Pin holes | | none | none | none | none | none | numerous |
| Adhesive property after annealing 750°C × 2 hrs. in 100% $N_2$ | | o | ◎ | o | ◎ | o | ◎ |
| Coating amount g/m² | | 2.5 | 2.5 | under coat 1.5 upper coat 2.0 | coat 1.5 coat 2.2 | 2.2 | 1.5 | at 400°C for 50 min., and then coated with treating solution 4 and baked again at 400°C for 10 min. to obtain a double layer coating film. The coating amount of under coat was 1.5g/m², and that of the upper coat was 2.0 2.0, 2.1, 2.3, 2.1, 2.2, 2.0 and 2.2g/m², respectively.

These steel strips were piled and TIG welded under the conditions of a welding electric current of 120 A, a screwing pressure of 100kg/cm² and varying welding velocity of 10 - 100cm/min. The results were as shown in FIG. 2(b).

It is obvious from the results that, when the surface roughness is greater than 20 Hr.m.s.μinch, an excellent result can be obtained under a remarkably high welding speed.

In the punching test for the samples with the surface roughness of 5 and 40 Hr.m.s.μinch by using a steel die, 1,950,000 and 2,100,000 punchings were possible, respectively, until the height of the burr reached 50μ.

Treating solution 3

| | |
|---|---|
| Water | 100kg |
| Anhydrous chromic acid | 20kg |
| Calcium hydroxide | 3kg |
| Boric acid | 2kg |
| Triethanolamine | 2kg |

Example 4

An electrical steel sheet (containing 0.5 percent of Si, 980mm width) was rolled by a roller whose under roll was rough to obtain steel strips of 0.5mm thickness.

The surface roughness of the steel strip was: upper side 5 Hr.m.s.μinch and under side 60 Hr.m.s.μinch.

Said steel strips were coated with the treating solution 5 by a rubber roller and baked at 500°C for 10 seconds. The coating amount was 2.3g/m². In punching them to obtain motor cores (85mm in diameter), 2,300,000 punchings were possible until the height of burr reached 50μ. In MIG welding of said strips after piling under the conditions of an electric current of 130 A, a screwing pressure of 45kg/cm² and welding speed of 100cm/min., the welding could smoothly be carried out without the formation of blowholes.

Treating solution 5

| | |
|---|---|
| Water | 100kg |
| Anhydrous chromic acid | 20kg |
| Calcium hydroxide | 7kg |
| Glycerine | 1kg |
| Vinyl acetate — acrylic acid copolymer emulsion (50% solution) | 10kg |

Example 5

Electrical steel strips (containing 0.7 percent of Si, 970mm width and having a surface roughness of 7 Hr.m.s.$\mu$inch) were coated with the the treating solution 1 (as in Example 1) by a rubber roller. During baking at 500°C for 20 seconds, said steel strips were passed through a steel roller having a rough surface. The coated amount was 6.5g/m², and the roughness of the finished surface was 4.5 $\mu H_{max}$.

Steel strips having said coating were piled and TIG welded. Even under a high welding speed of 100cm.min. with an electric current of 120 A, fine beads were obtained without the formation of blowholes. Separately, said steel strips were punched by a steel die (with a clearance of 6 percent), and 1,950,000 punchings were possible until the height of burr reached 50$\mu$.

As a comparison, steel strips with the same quality as above were coated with treating solution 1 by a rubber roller. After baking under the usual conditions, the coating amount was 6.4g/m², and the surface roughness was less than 1 $\mu H_{max}$.

In the welding test of this steel strip under a welding speed of 25cm/min., blowholes were formed on about a half of the beads. Under a welding speed of 10cm/min., the product was useable although some formation of blowholes was observed. By using a steel die, 1,800,000 punchings were made until the height of burr reached 50$\mu$.

Example 6

Electrical steel strips (containing 0.3 percent of Si, 1000mm width and having a surface roughness 7 Hr.m.s.$\mu$inch) were coated with treating solution 2 (as in Example 2) by a rubber roller. During baking at 400°C for 60 seconds, said steel strips were passed through a steel roller having a rough surface. The surface roughness of the coating film was 3.5 $\mu H_{max}$, and the coating amount was 3.2g/m².

When said steel strips were piled and welded under the conditions of a welding electric current of 120 A, a screwing pressure 100kg/cm² and a welding speed 100cm/min., fine beads without no blowholes were obtained.

As a comparison, the same steel strips as above were treated with the treating solution in the usual manner. The surface roughness was 0.6 $\mu H_{max}$, and the coating amount was 3.1g/m².

When said steel strips were welded under the conditions of welding of an electric current of 120 A, a screwing pressure of 100kg/cm² and a welding speed of 20cm/min., blowholes were formed on about a half of the beads.

In the punching test of the inventive material steel strips in this example by using a steel die (clearance 7 percent), 2.650,000 punchings were possible until the height of burr reached 50 $\mu$, showing that the result is quite excellent as compared with the steel strip having a conventional inorganic type coating film.

Example 7

Electrical steep strips (rimmed steel, 970mm width with a surface roughness of 7 Hr.m.s.$\mu$inch) were coated with the treating solution 3 (as in Example 3), baked at 400°C for 50 seconds, and then coated with the treating solution 4 (as in Example 3). During baking at 400°C for 10 seconds, these steel strips were passed through a steel roller having a roughened surface to give surface roughnesses in of the final film of 2, 3, 4 and 5$\mu H_{max}$. The coating amount of the under coat was 1.5g/m², and that of the upper coat was 2.9, 3.3 and 3.2g/m², respectively.

These steel strips were piled and TIG welded under the conditions of an electric current of 120 A, a screwing pressure of 100kg/cm² and a varying welding velocity of 10 – 100cm/min. The results are as shown in FIG. 4. In the figure, the results with the surface roughness of the final film of 0.5$\mu H_{max}$ (3.0g/m²) and 1$\mu H_{max}$ (3.1g/m²) are also given as a comparison.

It is obvious that, when the surface roughness of the final film is greater than 3$\mu H_{max}$, an excellent result can be obtained under a remarkably high welding speed.

In the punching test of the samples with the surface roughness of 0.5 and 40 $\mu H_{max}$ by using a steel die, 1,950,000 and 2,100,000 punchings were possible until the height of burr reached 50$\mu$.

Example 8

Electrical steel strips (containing 0.5 percent of Si, 980mm width and having a surface roughness 7 Hr.m.s.$\mu$inch) were coated with treating solution 6 by a rubber roller. During baking at 500°C for 10 seconds, these steel strips were passed through a steel roller whose upper roll was rough. The surface roughness of the one side of the coating film was 6$\mu H_{max}$, and that of the other side was 0.5$\mu H_{max}$. The coating amount in total was 6.4g/m². In punching them to obtain a motor core (85mm in diameter), 2,300,000 punchings were possible until the height of burr reached 50$\mu$. In MIG welding of the strip after piling under the conditions of an electric current of 130 A, a screwing pressure of 45kg/cm² and a welding speed of 100cm/min., the welding could smoothly be carried out without the formation of blowholes.

| Treating solution 6 | |
|---|---|
| Water | 100kg |
| Polyvinyl alcohol | 10kg |
| Melamine-alkyd resin | 5kg |

What is claimed is:

1. Electrical steel sheets and strips having excellent punching and welding characteristics for the production of a laminated iron core, which comprise an electrical steel sheet or strip substrate having a surface roughness larger than 20 Hr.m.s.$\mu$inch and having an organic type coating film thereon selected from the group consisting of calcium lignin sulfonate, polyvinyl alcohol, anhydrous maelic acid resin, aminoacid resin, phenol resin, acrylic acid resin or its copolymers, vinyl acetate or its copolymers, alkyd resins, vinyl chloride or its copolymers, polyvinyl acetal, epoxy resins, and mixtures thereof.

2. Electrical steel sheets and strips according to claim 1 which further comprises a coating film composed of one or more materials selected from the group consisting of phosphoric acid, and chromic acid and salts thereof applied as an under coat for the organic type coating film.

3. Electrical steel sheets and strips having excellent punching and welding characteristics for the production of a laminated iron core which comprise an electrical steel sheet or strip substrate having a surface rougher than 20 Hr.m.s.$\mu$inch and having a coating film thereon composed of a mixture of one or more materials selected from the group consisting of phosphoric acid type and chromic acid and salts thereof and an organic resin selected from the group consisting of calcium lignin sulfonate, polyvinyl alcohol, anhydrous maleic acid resin, aminoacid resin, phenol resin, acrylic acid resin or its copolymers, vinyl acetate or its copolymers, alkyd resins, vinyl chloride or its copolymers, polyvinyl acetal, epoxy resins, and mixtures thereof.

* * * * *